H. M. DUDLEY.
FABRIC TREATING DEVICE.
APPLICATION FILED JAN. 21, 1919.

1,330,247.

Patented Feb. 10, 1920.
9 SHEETS—SHEET 2.

INVENTOR
Howard M. Dudley
BY Howard Freeman
his ATTORNEY

H. M. DUDLEY.
FABRIC TREATING DEVICE.
APPLICATION FILED JAN. 21, 1919.
1,330,247.
Patented Feb. 10, 1920.
9 SHEETS—SHEET 3.
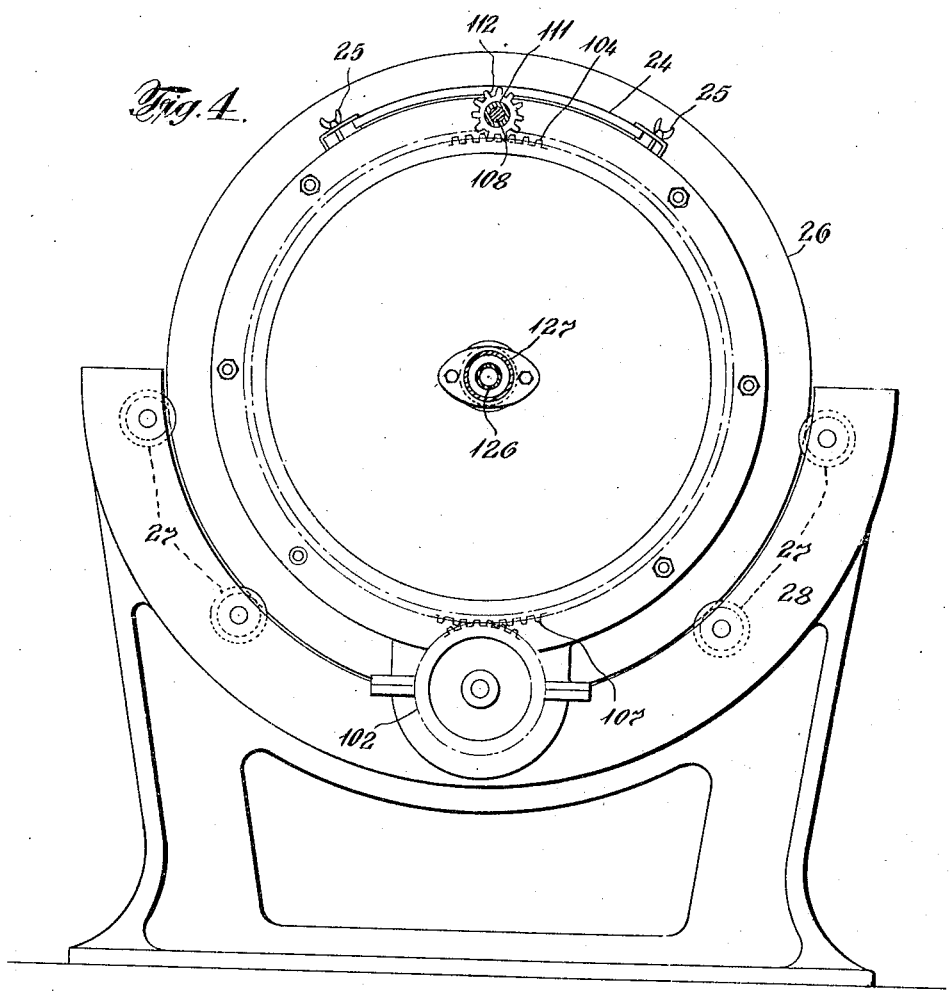

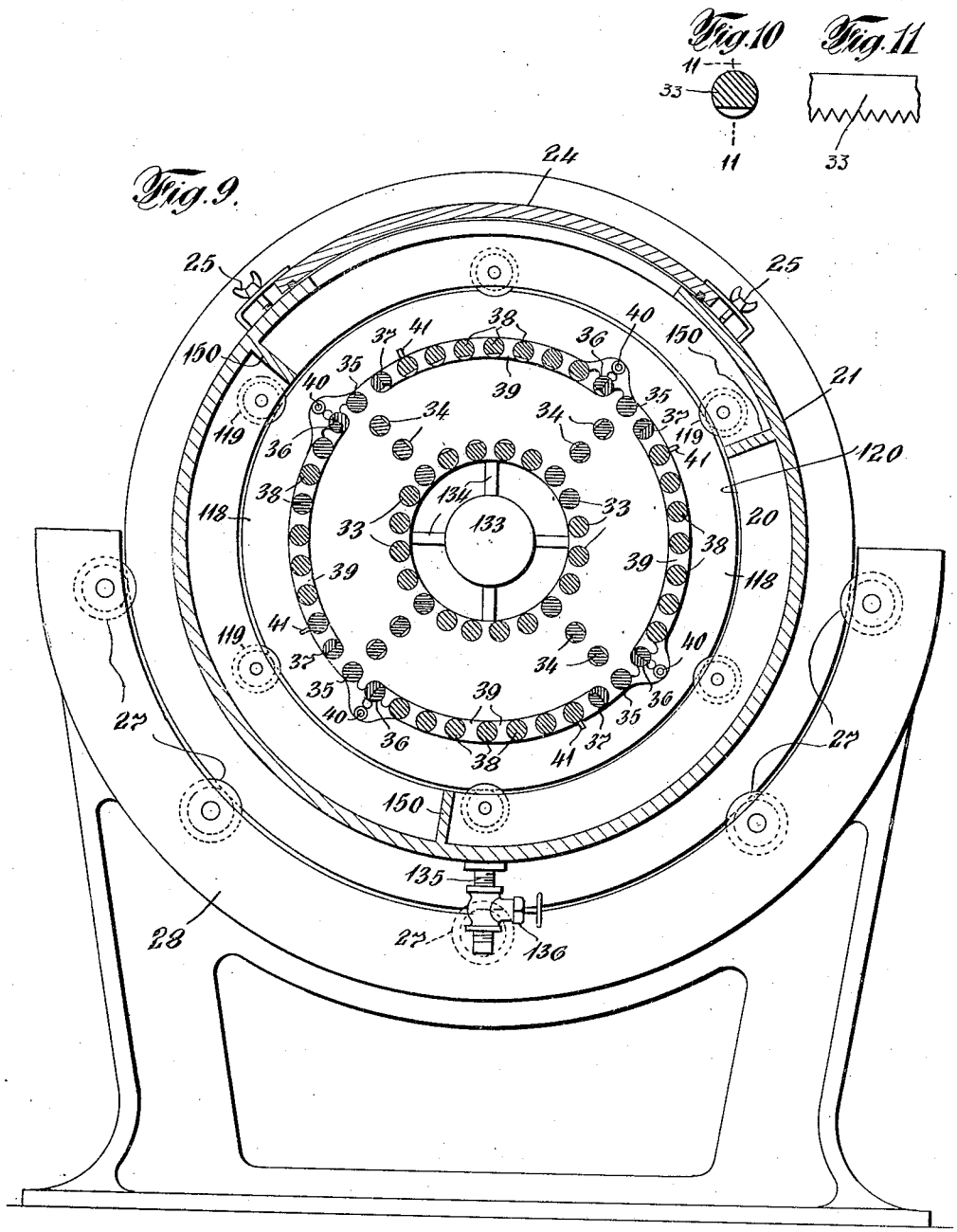

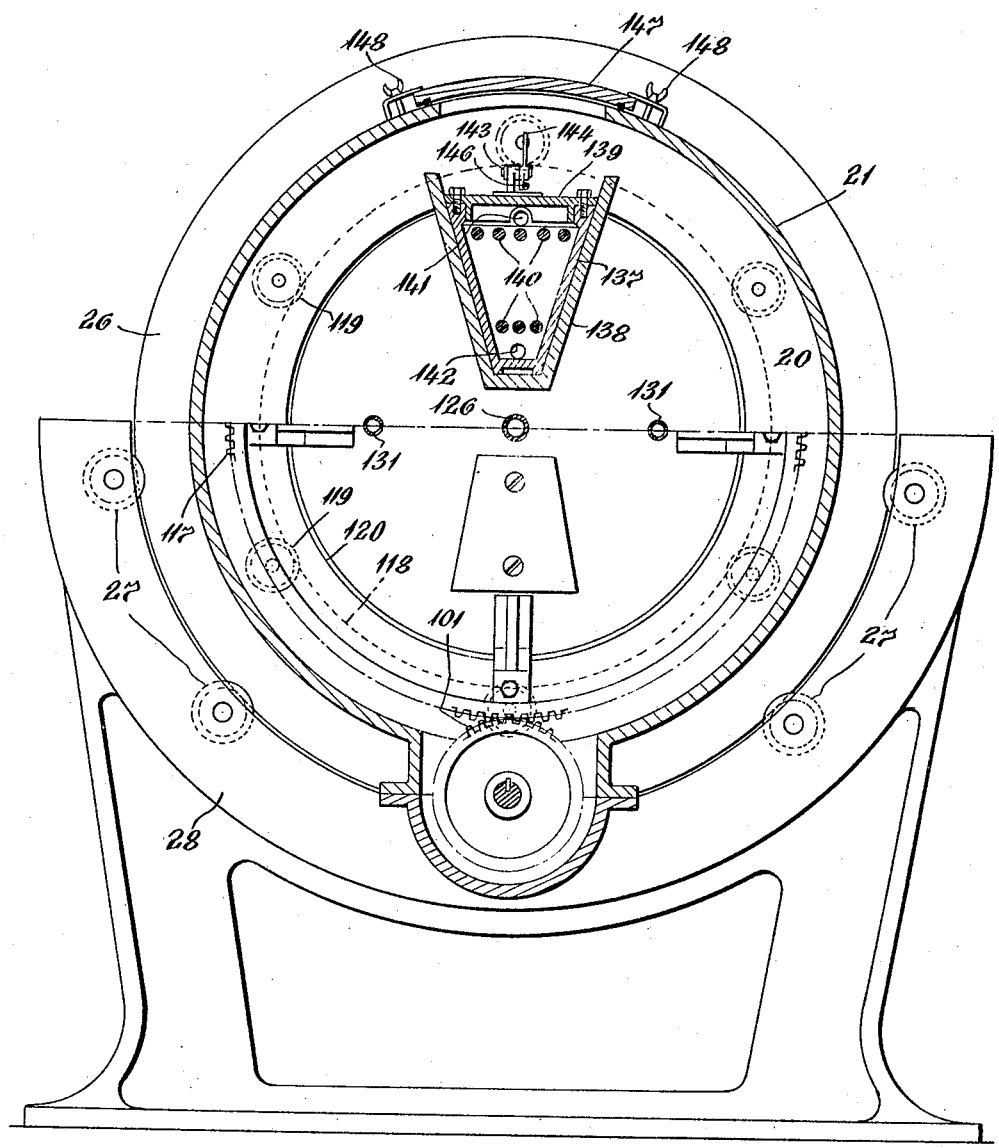

H. M. DUDLEY.
FABRIC TREATING DEVICE.
APPLICATION FILED JAN. 21, 1919.

1,330,247.

Patented Feb. 10, 1920.
9 SHEETS—SHEET 6.

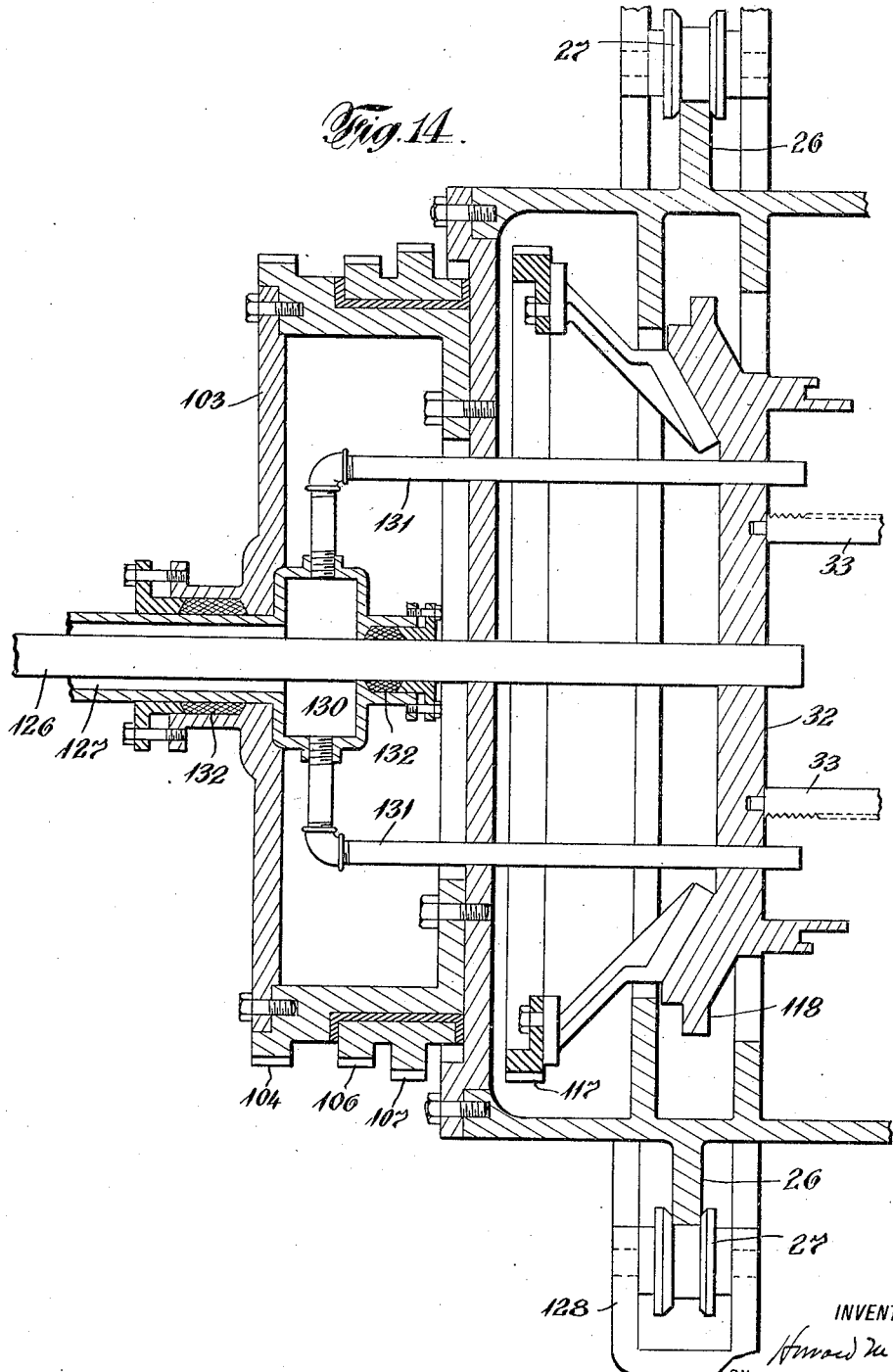

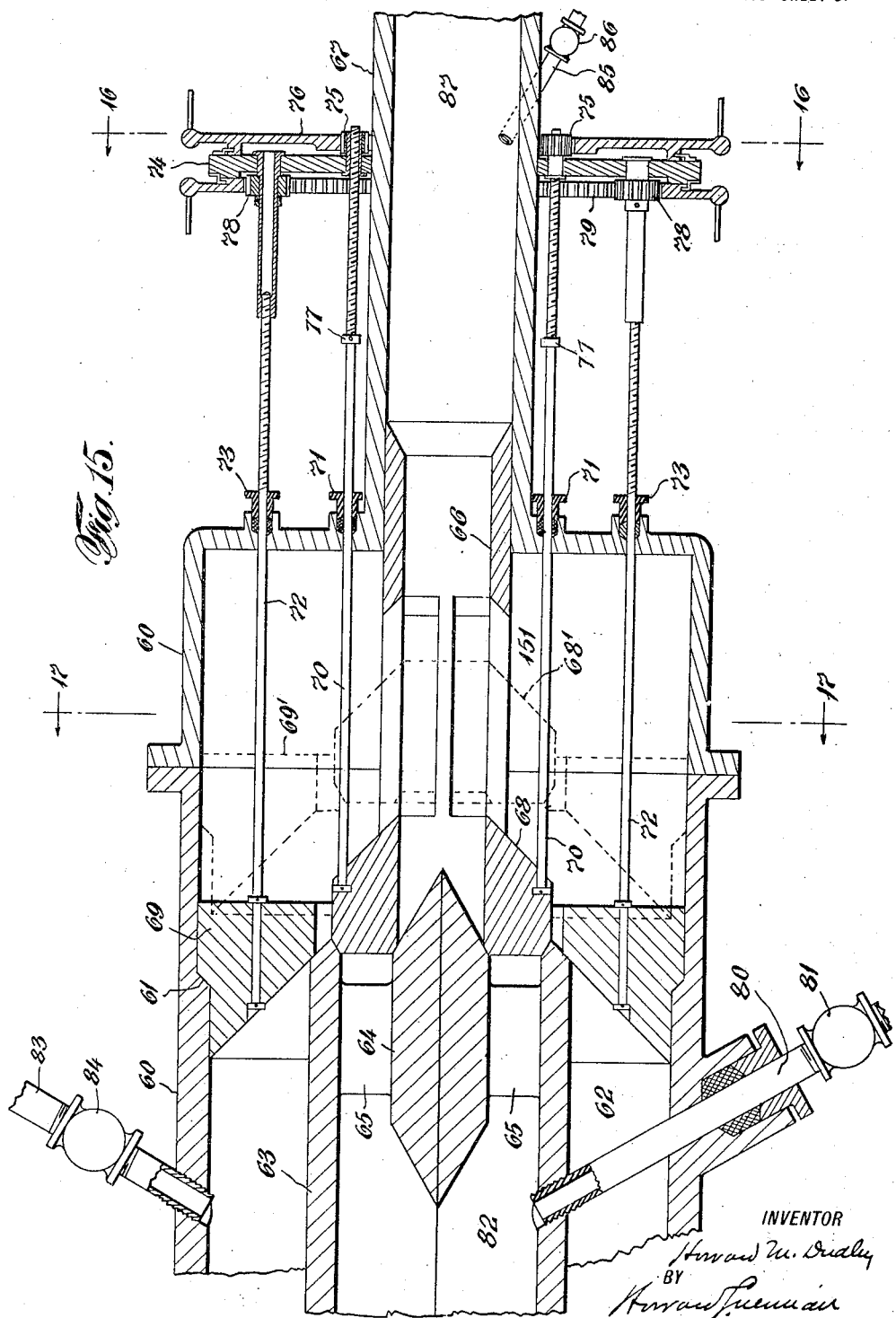

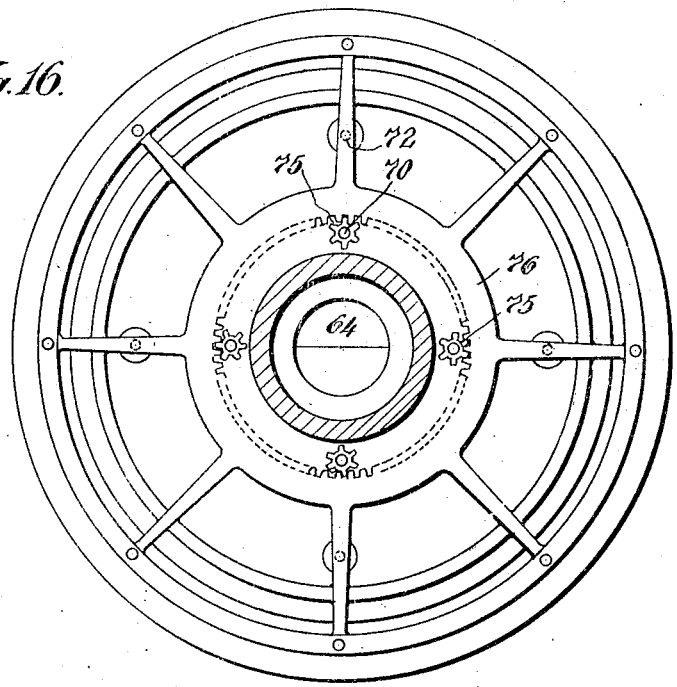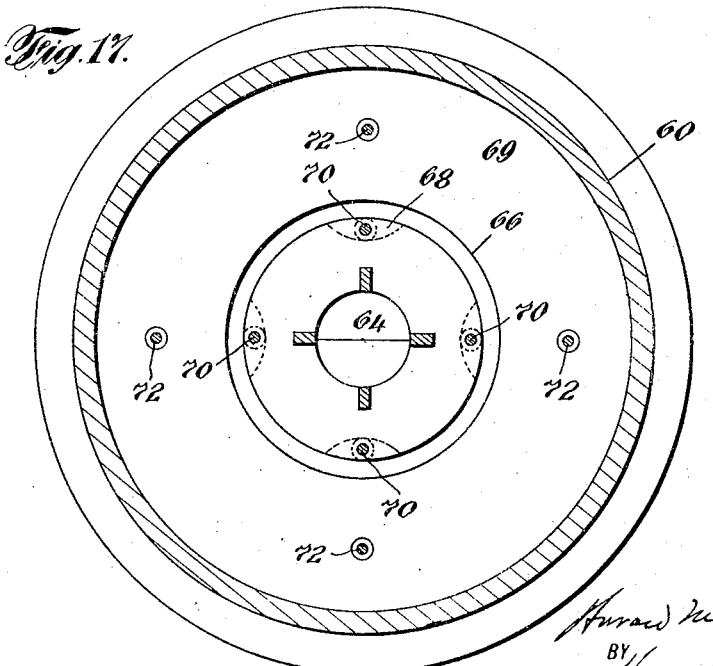

UNITED STATES PATENT OFFICE.

HOWARD M. DUDLEY, OF PHILADELPHIA, PENNSYLVANIA.

FABRIC-TREATING DEVICE.

1,330,247.      Specification of Letters Patent.      Patented Feb. 10, 1920.

Application filed January 21, 1919. Serial No. 272,269.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Fabric-Treating Devices, of which the following is a full, clear, and exact specification.

My invention relates to devices suitable for the treatment of textile fibers and fabrics and refers particularly to devices in which the fiber or fabric is treated with moving fluids or gases.

One object of my invention is a device in which textile fiber and fabrics may be dyed, dry-cleaned, after-treated, steamed, oxidized and washed without manual handling of the goods during the complete series of operations.

In the device of my invention, the fiber or fabric may be revolved in one direction while the liquid is revolved, or moved, in the opposite direction, subjecting the goods to a thorough treatment and complete and equal penetration, thus insuring efficient and uniform results.

My device, therefore, has incorporated within it means for producing effects which are now obtainable only by the use of a number of different machines.

In the drawings illustrating one form of the device of my invention, similar parts are designated by similar numerals:—

Fig. 4 is an enlarged section through the line 4—4 of Fig. 1.

Fig. 5 is a vertical section of a modified form of the bars.

Fig. 6 is a section through the line 6—6 of Fig. 5.

Fig. 7 is a vertical section of a modified form of the bars.

Fig. 8 is a section through the line 8—8 of Fig. 7.

Fig. 9 is an enlarged section through the line 9—9 of Fig. 1.

Fig. 10 is a vertical section through one of the bars.

Fig. 11 is a section through the line 11—11 of Fig. 10.

Fig. 12 is an enlarged section through the line 12—12 of Fig. 1.

Fig. 14 is a section through the line 14—14 of Fig. 13.

Fig. 15 is an enlarged vertical section of the valve.

Fig. 16 is a section through the line 16—16 of Fig. 15.

Fig. 17 is a section through the line 17—17 of Fig. 15.

Figure 1:
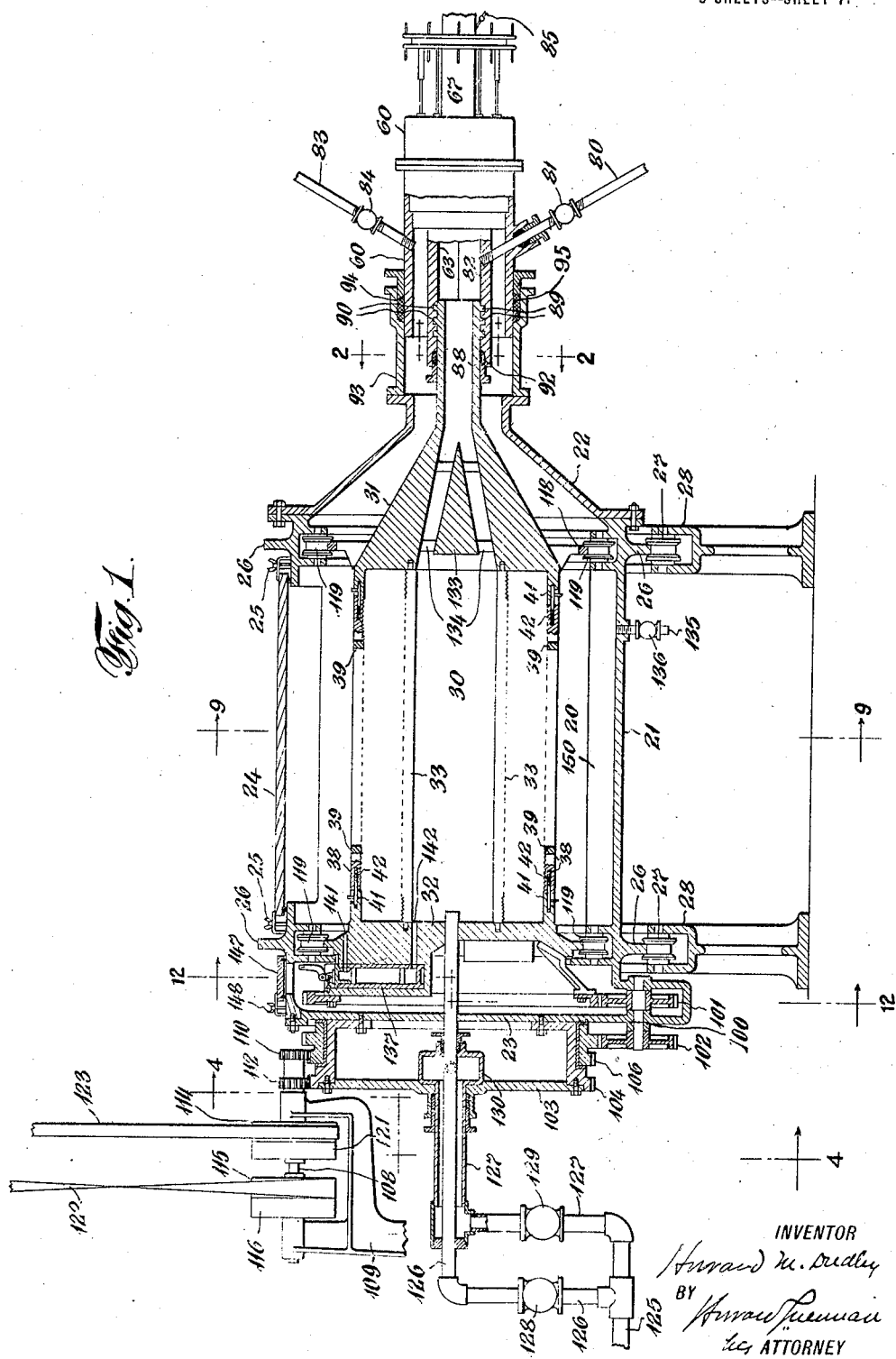
Figure 1 is a vertical cross-section of one form of my device.
Figure 2:
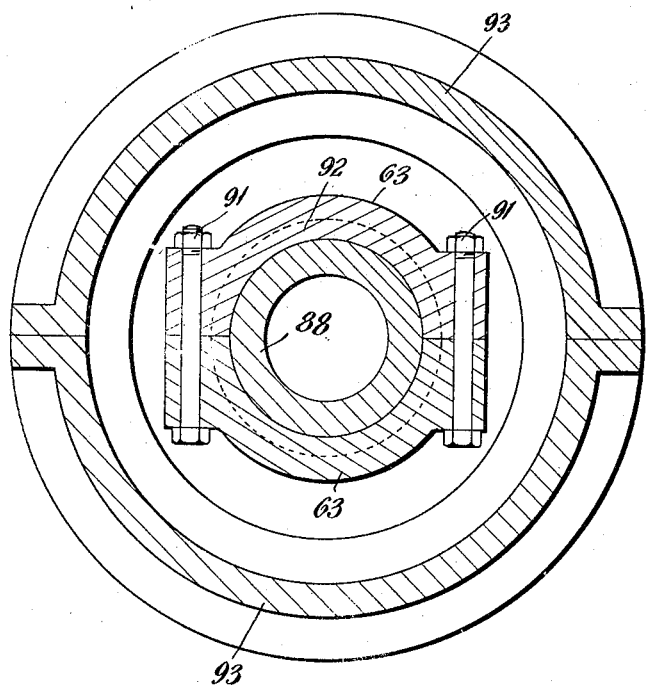
Fig. 2 is an enlarged section through the line 2—2 of Fig. 1.
Figure 3:
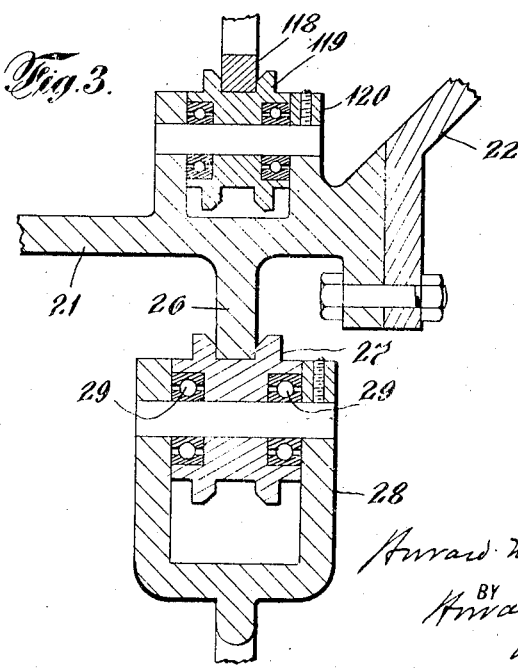
Fig. 3 is an enlarged section of the ball bearing rollers of the dyeing chamber and the fabric chamber.
Figure 13:
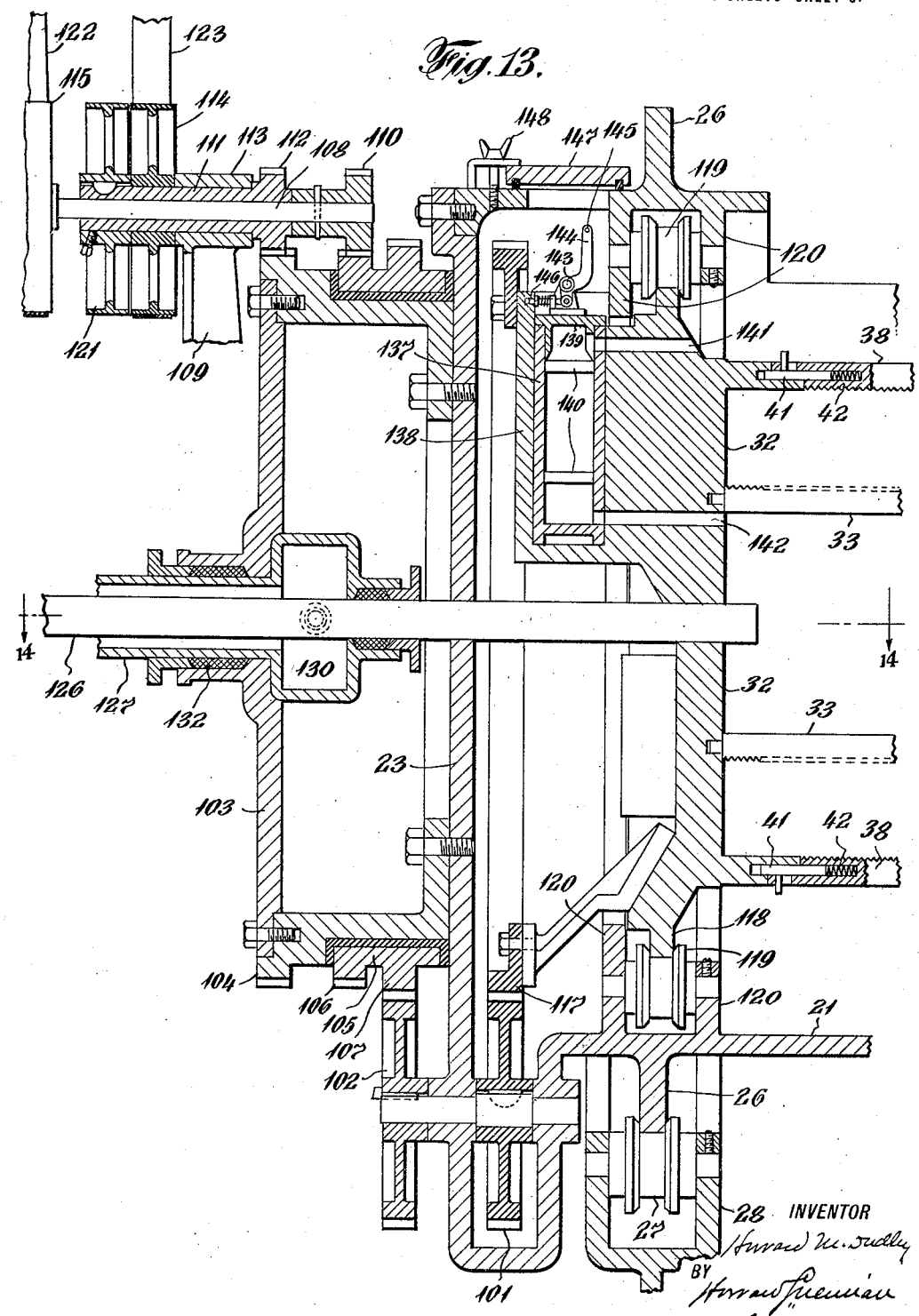
Fig. 13 is an enlarged broken vertical section of the revolving mechanism and its attached parts.

The particular form of my device illustrated in the accompanying drawings, comprises a dyeing chamber 20, formed by the revoluble cylindrical side 21, the conical end 22 and the end 23, the side 21 carrying the cover 24 capable of being attached thereto by the clamping members 25, 25. The side 21 has the two extended flange end members 26, 26 abutting upon a series of rollers 27, 27, 27 carried by the semi-circular supporting members 28, 28. The rollers 27, 27 revolve in the ball-bearings 29, 29.

Within the dyeing chamber 20 is a fabric chamber 30, having the conical end 31 and the end 32. Within the central portion of the fabric chamber is a series of parallel spaced bars 33, 33 connecting the ends 31 and 32. Extending radially from the bars 33, 33 is a series of parallel spaced bars 34, 34 also connecting the ends 31 and 32. Extending longitudinally of the device is a series of bars 35, 35 and a series of split bars 36, 36, 37, 37 connecting the ends 31 and 32. One half of each of the split bars 36, 36, 37, 37 is not connected to the ends 31 and 32, but is connected to a series of parallel spaced bars 38, 38, 38 by means of the connecting bars 39, 39 and the cover thus formed is hinged at 40 to the fixed bar 35. The bar 38 farthest removed from the hinge 40 carries a slidable pin 41 at each end thereof capable of placement within a recess in the end 31 or 32, the pin 41 being maintained in the recess by the spring 42 thus keeping the cover in a closed position. The fabric chamber therefore comprises a series of compartments, each formed by a series of bars 33, 33, two series of bars 34, 34 and a hinged cover of a series of bars 38, 38.

The valve (Fig. 15) comprises a cylindrical member 60, composed of two parts for convenience of assembling, having the annular shoulder 61. Within the chamber 62, formed by the member 60, is a hollow cylindrical member 63 made in two parts to which is attached the member 64 by means of the supporting arms 65, 65. The inner portion of the member 65 is beveled for purposes to be described later. A slidable hollow valve member 66, slidable within the cylindrical member 67, carries an enlarged annular end 68, capable of abutment upon the bevel of the member 63 and the member 64, forming a tight joint therewith. A slidable annular valve member 69 is abuttable upon the shoulder 61 and the bevel of the member 63 forming a tight joint therewith. A series of rods 70, 70 revolubly attached to the member 68 are slidable through the bushings 71, 71 and a series of rods 72, 72 revolubly attached to the member 69 are slidable through the bushings 73, 73, the exterior ends of the rods 70, 70, 72, 72 being threaded. A collar 74 is fixedly attached to the member 67. Revoluble upon the collar 74 is a series of gear wheels 75, 75 having an internal thread meshing with the threads of the rods 70, 70. A revoluble internally toothed member 76 meshes with the gears 75, 75 so that the revolution of the member 76 revolves the gear wheels 75, 75, thus moving the rods 70, 70 and the valve member 68 inwardly and outwardly, the outward movement being stopped by the collar 77 in which case the member 68 is in the position shown by the dotted lines 68'. A similar movement is given the rods 72, 72 and the valve member 69 by means of the internally threaded revoluble gear wheels 78, 78 and the revoluble internally geared member 79. A pipe 80, carrying the valve 81, connects the chamber 82 with a reservoir (not shown) from which the liquid may be used for continuous circulation, and a pipe 83, carrying the valve 84, connects the chamber 62 with a reservoir for a similar purpose. A pipe 85, carrying the valve 86, enters the chamber 87 by means of which air, steam or other gases or liquids may be introduced into the device.

The method of attaching the valve to the device is as follows:—

The conical end 31 is extended into the cylindrical end 88 having the annular flanges 89, 89. The two parts of the member 63 are placed around the member 88, the annular flanges 90, 90 of the former fitting into the recesses formed by the projections 89, 89 of the member 88 and fastened together by the bolts 91, 91. A tight joint is made by the packing 92. The two parts of the member 93 are then placed in position and clamped by the clamping members 94, 94 and a tight joint made by the packing 95.

The revolving mechanism is as follows:—

The end 23 carries the revoluble shaft 100 to which are fixedly attached the two gear wheels 101 and 102. Fixedly attached to the end 23 is the chambered member 103, carrying the toothed gear 104 integral therewith and the loose member 105 having the gears 106 and 107. A revoluble shaft 108, carried by the support 109, has fixedly attached thereto the gear 110 meshing with the gear 106. Revoluble around the shaft 108 is the sleeve 111 carrying the gear 112 meshing with the gear 104 and the fixedly attached pulley 121. Revoluble around the sleeve 111 is the sleeve 113 carrying the attached pulley 114. The shaft 108 carries the loose pulley 115 and the fixedly attached pulley 116. Fixedly attached to the end 32 is the toothed gear 117. The ends 31 and 32 have the annular flanges 118, 118 abutting upon the wheels 119, 119, 119, which are supported on ball-bearings upon the extensions 120, 120 of the side 21.

The dyeing chamber and the fabric chamber are revolved as follows:—

If the twisted belt 122 is on the loose pulley 115 and the belt 123 is on the tight pulley 121, the sleeve 111 and the gear 112 will revolve revolving the gear 104 and the end 23. The gear 102 will revolve around the gear 107 and the gear 101 will revolve around the gear 117 and thus the fabric chamber will remain stationary while the dyeing chamber will revolve.

If, however, the belt 122 is on the tight pulley 116 and the belt 123 is on the loose pulley 114, the shaft 108 with the gear 110 will revolve, thus revolving the gears 106, 105, 101 and 117, which in turn revolves the end 32 and the fabric chamber while the dyeing chamber remains stationary.

If the belt 122 is on the tight pulley 116 and the belt 123 is on the tight pulley, both the dyeing chamber and the fabric chamber will revolve in opposite directions as respect to each other.

A steam pipe 125 has the two extensions 126 and 127, carrying the valves 128 and 129 respectively. The pipe 126 passes through the pipe 127 and into the device. The pipe 127 is extended into the chamber 130 from which branch the two pipes 131, 131 into the device. The pipes are properly fitted with the bushings 132, 132. A conical shaped member 133 is supported by the arms 134, 134 on the interior of the end 31. A drain pipe 135, having the valve 136, is connected to the dyeing chamber 20.

A smaller testing device 137 is situated within the chamber formed by the extension 138 of the end 32 and is similar to one of the fabric compartments. The testing device has a removable top 139 and contains a series of parallel spaced bars 140, 140 at its upper and lower portions. A conduit 141 connects the testing device with the dyeing chamber and a conduit 142 connects it with the fabric chamber. The top 139 carries a shaft 143 upon which is situated the revoluble arm 144, having a hole 145 at its upper extremity and a pin 146 pivoted at its lower end, the pin 146 fitting within a recess in the wall 137 and maintained therein by a spring. A cover 147 is clamped to the side 21 by the clamps 148, 148. By inserting a hook within the hole 145 and lifting, the pin 146 is removed from the recess and the entire testing device may be removed for examination.

The side 21 carries a series of spaced longitudinal baffle plates 150, 150.

Figs. 10 and 11, illustrate the form of the bars 33, 34 and 38 shown in the drawings and Figs. 5 and 6, 7 and 8 illustrate modifications of these bars 33$^A$ and 33$^B$.

The operation of the device is as follows:—

The testing device and the fabric compartments are loaded with the fiber or fabric, the covers closed and clamped, and the cover 25 of the dyeing chamber is closed and clamped. All of the valves are closed except valve 84, the valve members are placed in the positions 69, 68' and the liquid forced through the pipe 67. The liquid thus passes through the chambers 87, 151, 82 and through the member 88 into the chamber 30 and thence outwardly through the fabric chamber, the dyeing chamber, the member 31 and the pipe 83 for continuous circulation. The reverse flow of the liquid is caused by closing valve 84, opening valve 81, and placing the valve members in the position 69', 68 the liquid then passing through the device, inwardly through the fabric chamber and out through the pipe 80 for continuous circulation. During these operations the liquid also passes through the testing device in reverse directions. During this treatment process, the fabric chamber and the dyeing chamber may be revolved separately of each other, or at the same time in reverse directions, the baffle plates 150, 150 aiding in causing a complete intermingling of the liquid and the fiber, or fabric, in the fabric chamber.

Air, other gases, water or other liquids may be introduced through the pipe 80 as desired and steam may be introduced through the pipe 125.

The condition of the contents of the fabric chamber may be judged by examining the contents of the testing device.

By the advice of my process therefore, the fabric may be treated by a liquid passing in reverse directions, the liquid at the same time being agitated to increase the efficiency of the process.

I do not limit myself to the particular size, shape, number or arrangement of parts described and shown, all of which may be varied without going beyond the scope of my invention as described and claimed.

What I claim is:—

1. In a fabric treating device, in combination, a revoluble dyeing chamber, a revoluble fabric chamber within the dyeing chamber, means for continuously revolving the two chambers and means for passing a liquid and a gas through the two chambers.

2. In a fabric treating device, in combination, a revoluble dyeing chamber, a revoluble fabric chamber within the dyeing chamber, means for continuously revolving the two chambers in reverse directions with respect to each other and means for the continuous passage of liquids and gases through the two chambers.

3. In a fabric treating device, in combination, a revoluble dyeing chamber, a revoluble fabric chamber within the dyeing chamber, means for continuously revolving the two chambers in reverse directions with respect to each other and means for the continuous passage of liquids and gases through the two chambers alternately in reverse directions.

4. In a fabric treating device, in combination, a revoluble dyeing chamber, a revoluble fabric chamber comprised of a series of spaced parallel bars within the dyeing chamber, means for revolving the two chambers and means for passing a liquid and a gas through the two chambers.

5. In a fabric treating device, in combination, a revoluble dyeing chamber, a revoluble fabric chamber within the dyeing chamber, means whereby the two chambers may be revolved simultaneously or independently of each other and means for the continuous passage of liquids and gases through the two chambers.

6. In a fabric treating device, in combination, a revoluble dyeing chamber, a revoluble fabric chamber within the dyeing chamber, means whereby the two chambers may be revolved simultaneously or independently of each other and means for the continuous passage of liquids and gases through the two chambers in reverse directions.

7. In a fabric treating device, in combination, a revoluble dyeing chamber, a revoluble fabric chamber comprised of a series of spaced parallel bars within the dyeing chamber, means whereby the two chambers may be revolved simultaneously or independently of each other and means for the continuous passage of liquids and gases through the two chambers in reverse directions.

8. In a fabric treating device, in combination, a revoluble dyeing chamber, a revoluble fabric chamber within the dyeing chamber, means for revolving the two chambers, means for passing liquids and gases from within the fabric chamber through fabric therein and means for passing liquids and gases from the dyeing chamber inwardly through fabric within the fabric chamber.

9. In a fabric treating device, in combination, a revoluble dyeing chamber, a revoluble fabric chamber comprised of a series of spaced parallel bars within the dyeing chamber, means for revolving the two chambers, means for passing liquids and gases from within the fabric chamber through fabric therein and means for passing liquids and gases from the dyeing chamber inwardly through fabric within the fabric chamber.

10. In a fabric treating device, in combination, a revoluble dyeing chamber, a revoluble fabric chamber containing a series of foraminous compartments within the dyeing chamber, means for revolving the two chambers in reverse directions with respect to each other and means for the continuous passage of liquids and gases through the two chambers.

11. In a fabric treating device, in combination, a revoluble dyeing chamber, a revoluble fabric chamber containing a series of foraminous compartments comprised of a series of parallel spaced bars within the dyeing chamber, means whereby the two chambers may be revolved simultaneously or independently of each other and means for the continuous passage of liquids and gases through the two chambers.

12. In a fabric treating device, in combination, a revoluble dyeing chamber, a revoluble fabric chamber within the dyeing chamber, baffle-plates upon the inner face of the dyeing chamber, means for revolving the two chambers in reverse directions with respect to each other and means for the continuous passage of liquids and gases through the two chambers.

13. In a fabric treating device, in combination, a revoluble dyeing chamber, a revoluble fabric chamber within the dyeing chamber, baffle-plates upon the inner face of the dyeing chamber, means for revolving the two chambers, means for passing liquids and gases from within the fabric chamber through fabric therein and means for passing liquids and gases from the dyeing chamber inwardly through fabric within the fabric chamber.

Signed at New York city, in the county of New York and State of New York, this 18th day of January, 1919.

HOWARD M. DUDLEY.